(12) United States Patent
Krachler et al.

(10) Patent No.: US 8,297,683 B2
(45) Date of Patent: Oct. 30, 2012

(54) MOUNTING FRAME MEMBER FOR MOTOR VEHICLE TAILGATE HAVING FRAMELESS WINDOW PANE

(75) Inventors: Gerhard Krachler, Fehring (AT); Jürgen Hammer, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 266 days.

(21) Appl. No.: 12/766,140

(22) Filed: Apr. 23, 2010

(65) Prior Publication Data

US 2010/0270827 A1 Oct. 28, 2010

Related U.S. Application Data

(60) Provisional application No. 61/171,916, filed on Apr. 23, 2009.

(51) Int. Cl.
*B60J 5/10* (2006.01)
*B60J 10/08* (2006.01)

(52) U.S. Cl. .................. 296/146.9; 296/146.8; 296/106

(58) Field of Classification Search ............... 296/146.8, 296/146.9, 106, 50, 203.04, 193.08, 203.01
See application file for complete search history.

(56) References Cited

U.S. PATENT DOCUMENTS

| | | | | |
|---|---|---|---|---|
| 3,612,601 A | * | 10/1971 | Himka et al. | 296/51 |
| 3,699,716 A | * | 10/1972 | Wanlass | 49/40 |
| 5,072,984 A | * | 12/1991 | Jackson | 296/56 |
| 7,055,285 B2 | * | 6/2006 | Nozaki | 49/479.1 |

* cited by examiner

*Primary Examiner* — Dennis Pedder
(74) *Attorney, Agent, or Firm* — Jordan IP Law, LLC (57) ABSTRACT

A mounting frame member is provided for framing and sealing a frameless window pane of an after-market motor vehicle tailgate intended to replace a tailgate having a different structure. The mounting frame member includes a mounting frame body mounted to the motor vehicle, the mounting frame body including an integrally formed sealing weatherstrip at an inner peripheral region thereof. A supplemental sealing weatherstrip may be provided adjacent the sealing weatherstrip of the mounting frame body and over the frameless window pane. Accordingly, a single, unitary BIW structure may be utilized when effectuating after-market structural changes or replacements to an existing tailgate.

19 Claims, 8 Drawing Sheets

MOUNTING FRAME MEMBER FOR MOTOR VEHICLE TAILGATE HAVING FRAMELESS WINDOW PANE

The present application claims priority under 35 U.S.C. §119 to U.S. Provisional Patent Application No. 61/171,916 (filed on Apr. 23, 2009), which is hereby incorporated by reference in its entirety.

BACKGROUND

A tailgate is a type of door for a motor vehicle such as, for example, a station wagon, van, sport utility vehicles (SUV) and the like, that is generally mounted at a rear opening of the motor vehicle to restrict or permit access to a rear compartment of the motor vehicle.

Figure 1:
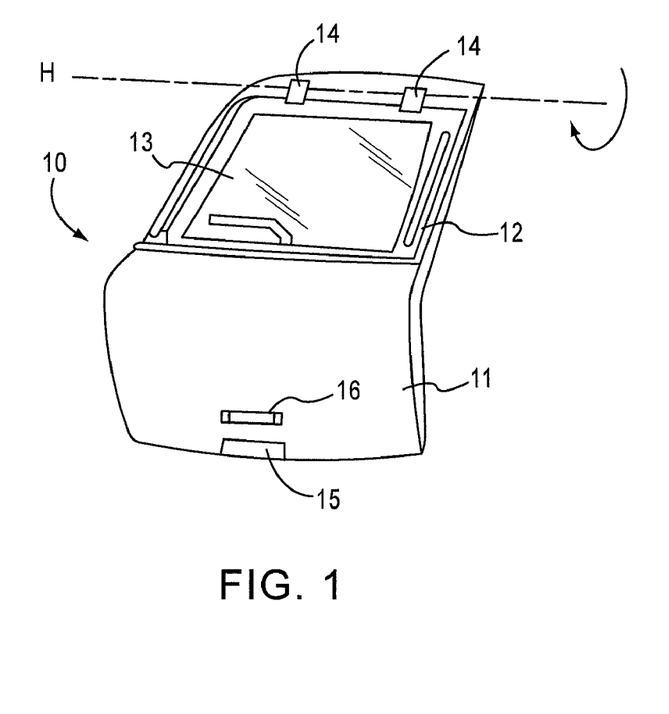
FIGS. 1-9 illustrate a mounting frame member for a frameless window pane of a tailgate, in accordance with embodiments.

As illustrated in FIG. 1, tailgate 10 may employ an integrated, unitary structure that includes main tailgate body 11 having frame member 12 at an upper portion thereof that defines a generally rectangular opening that receives a fixed, non-movable glass or window member 13. Tailgate 10 having such a structure is mounted generally at the rear opening of the motor vehicle through hinge connection 14 that permits selective movement of tailgate 10 between opened and closed positions about horizontal axis H relative to the main motor vehicle body. Latch assembly 15 is provided to permit selective actuation of hinge connection 14 via handle 16.

Figure 2:
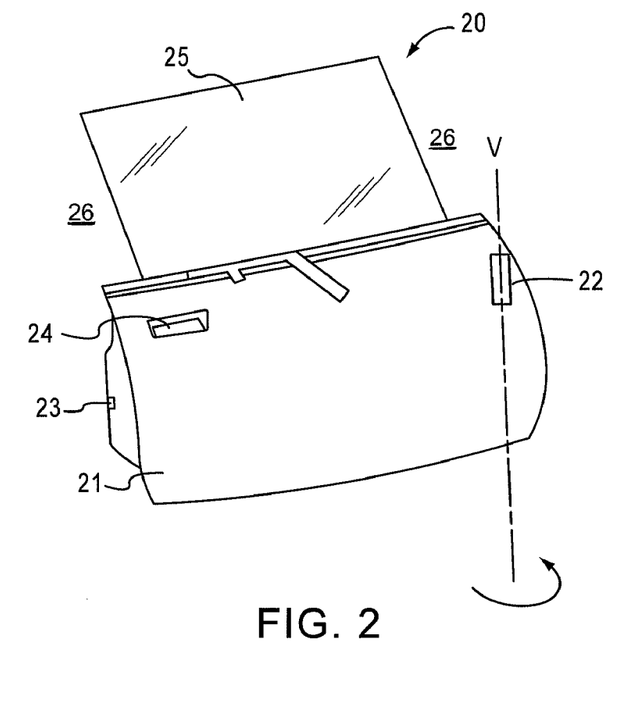

As illustrated in FIG. 2, another tailgate 20 structure may employ main tailgate body 21 that may be mounted generally at the rear opening of the motor vehicle through hinge connection 22 that permits selective movement of tailgate 20 between opened and closed positions about vertical axis V relative to the main motor vehicle body. Latch assembly 23 is provided to permit selective actuation of hinge connection 22 via handle 24. In such a structure, however, frameless glass or window member 25 is provided that may be fixed or moveable in a substantially upward-downward direction between a closed position within main tailgate body 21 and a raised position in which it extends at least partially from main tailgate body 21.

In the manufacture of motor vehicles, a body-in-white (BIW) is a vehicle body frame to which various sub assemblies are subsequently attached. In motor vehicles employing a tailgate, a BIW for one having a tailgate which is moveable about a horizontal axis differs from a motor vehicle employing a tailgate which is moveable about a vertical axis.

Accordingly, structural modification of the BIW is required in instances where it may be necessary, desirable or otherwise required to remove a tailgate structure as illustrated in FIG. 1 in place of an after-market tailgate having a different structure as illustrated in FIG. 2. When installing the after-market tailgate, however, the accompanying window pane may be frameless, and thus, unsealed gap 26 exists between the frameless window pane and the motor vehicle body that was previously occupied by the upper portion of the original tailgate. The presence of such an unsealed gap 26, of course, is undesirable since it will result in air leakage from the interior cabin of the motor vehicle, in addition to the entry of dust particles, rain, snow, sleet, etc. into the interior of the cabin.

SUMMARY

Embodiments relate to a mounting member for a motor vehicle tailgate that permits in a quick and efficient manner replacement (either during manufacturing or after-market) of a tailgate a hinge connection that permits selective movement of the tailgate between opened and closed positions about a horizontal axis relative to the main vehicle body.

In accordance with embodiments, a mounting member for a tailgate of a motor vehicle having a frameless window pane, the mounting member including at least one of the following: the mounting member body including a flange and a sealing weatherstrip provided over the flange at an inner peripheral edge of the mounting member body and having spaced apart upper and lower sealing members defining a channel which receives at least an edge of the frameless window pane to thereby provide a substantially weather tight seal between the mounting member and the frameless window pane.

In accordance with embodiments, a mounting member for a tailgate of a motor vehicle having a frameless window pane, the mounting member including at least one of the following: a mounting member body mounted to the motor vehicle, the mounting member body including a pair of parallel extending vertical members connected by a cross member extending generally perpendicular thereto, the cross member and each vertical member including a lower flange; and a sealing weatherstrip provided at an inner peripheral edge of the mounting member body and having an open channel which receives at least an upper edge of the frameless window pane.

In accordance with embodiments, a tailgate assembly provided at an opening of a motor vehicle having a sealing weatherstrip, the tailgate assembly including at least one of the following: a tailgate door mounted to the motor vehicle at the opening by a hinged connection to permit selective movement of the tailgate door about at least one of a vertical axis and horizontal axis between a closed position an opened position permitting access to an interior of the motor vehicle; a frameless window pane adapted for movement between a lower position and a raised position extending at least partially out of the tailgate door; and a mounting member body secured to the motor vehicle at the opening, the mounting member body including a flange extending throughout an inner periphery thereof and a sealing weatherstrip provided at an inner peripheral edge of the mounting member body and having a channel which receives at least an edge of the frameless window pane to thereby provide a substantially weather tight seal between the mounting member and the frameless window pane when the frameless window pane is placed in the raised position.

DRAWINGS

Example

DESCRIPTION

Figure 3:
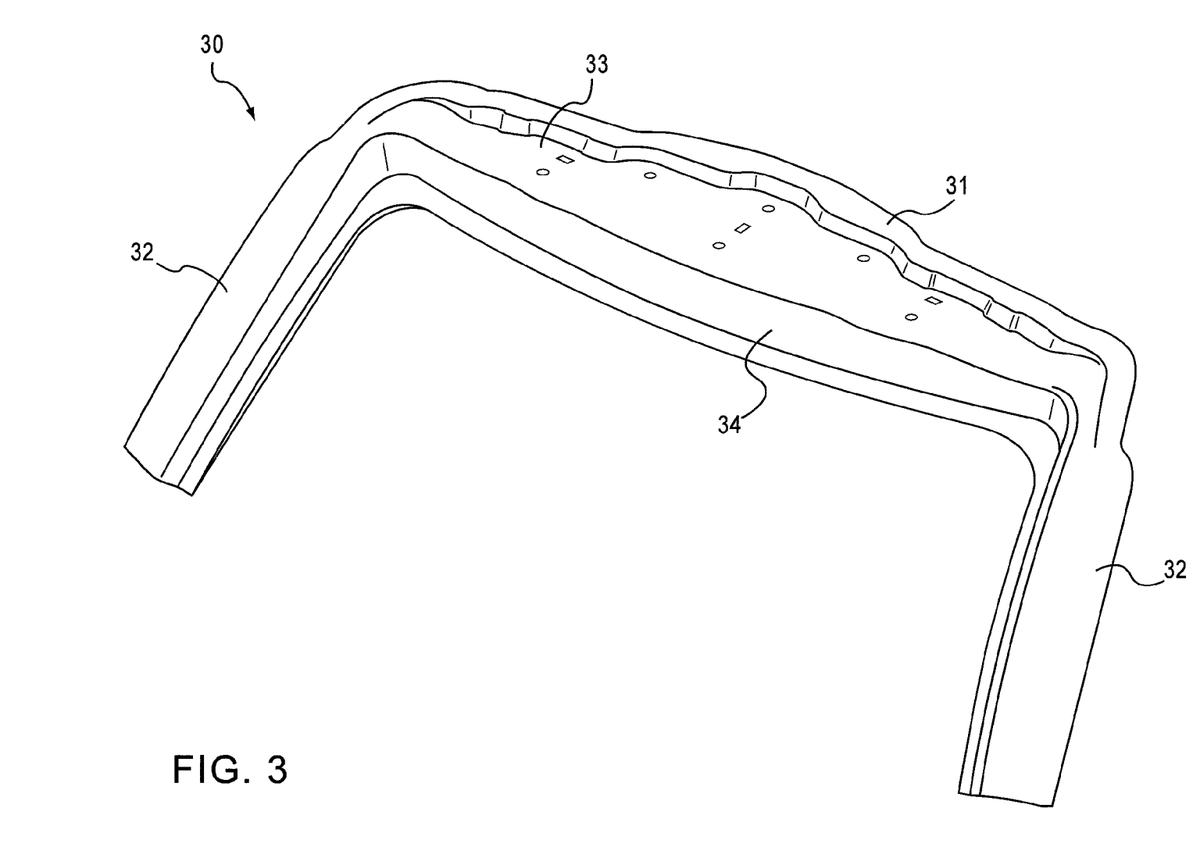

As illustrated in example FIG. 3, in accordance with embodiments, mounting frame member 30 is provided for framing and sealing a frameless window pane of an after-market motor vehicle tailgate to be installed on a motor vehicle, particularly, for replacement of a tailgate having a different structure. Mounting frame member 30 obviates the need to make structural variants or modifications to an original BIW in order to effectuate after-market changes or replacements to an existing tailgate. Meaning, a single, common BIW may be used to replace a tailgate having one structural design with one having a different structural design.

Figure 5:
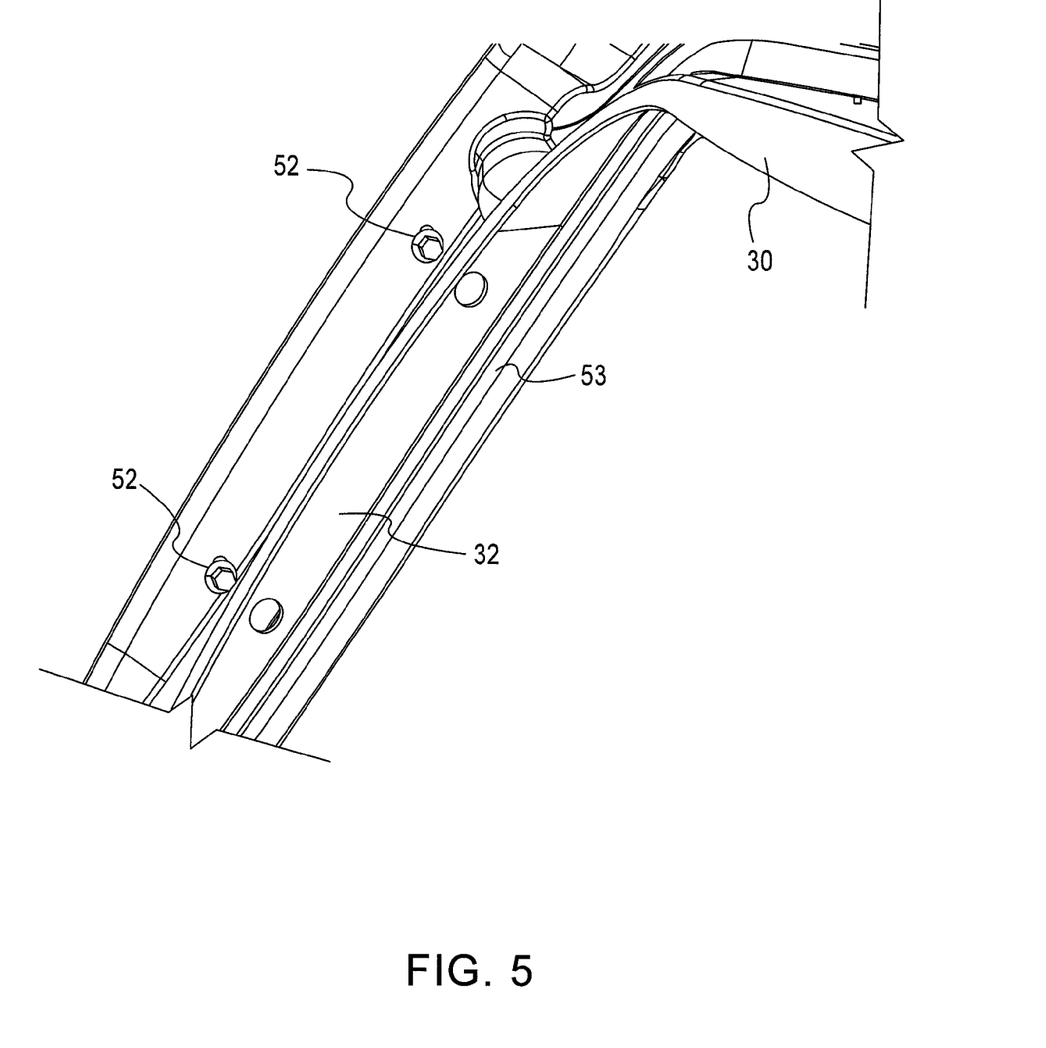

As illustrated in FIG. 5, mounting frame member 30 may be placed on and/or over existing weatherstrip seal 50 provided on the motor vehicle during assembly of an original tailgate.

Mounting frame body 31 includes a pair of parallel extending vertical members 32 connected by cross member 33 which extends generally perpendicular thereto. Mounting frame body 31 may have a unitary structure that includes sealing weatherstrip 34 provided at an inner peripheral edges of vertical members 32 and cross member 33 of mounting member body 31.

Mounting member 30 may have an overall lightweight such as, for example, approximately 1,860 g. Mounting member 30 may be composed of a moldable, flexible material. For instance, mounting member body 30 may be composed of a polymeric material, a sheet molding compound material (SCM), a metal material a composite material and any combination thereof. Mounting member 30 may have a hollow type configuration, or be formed without hollow spaces.

Figure 4:
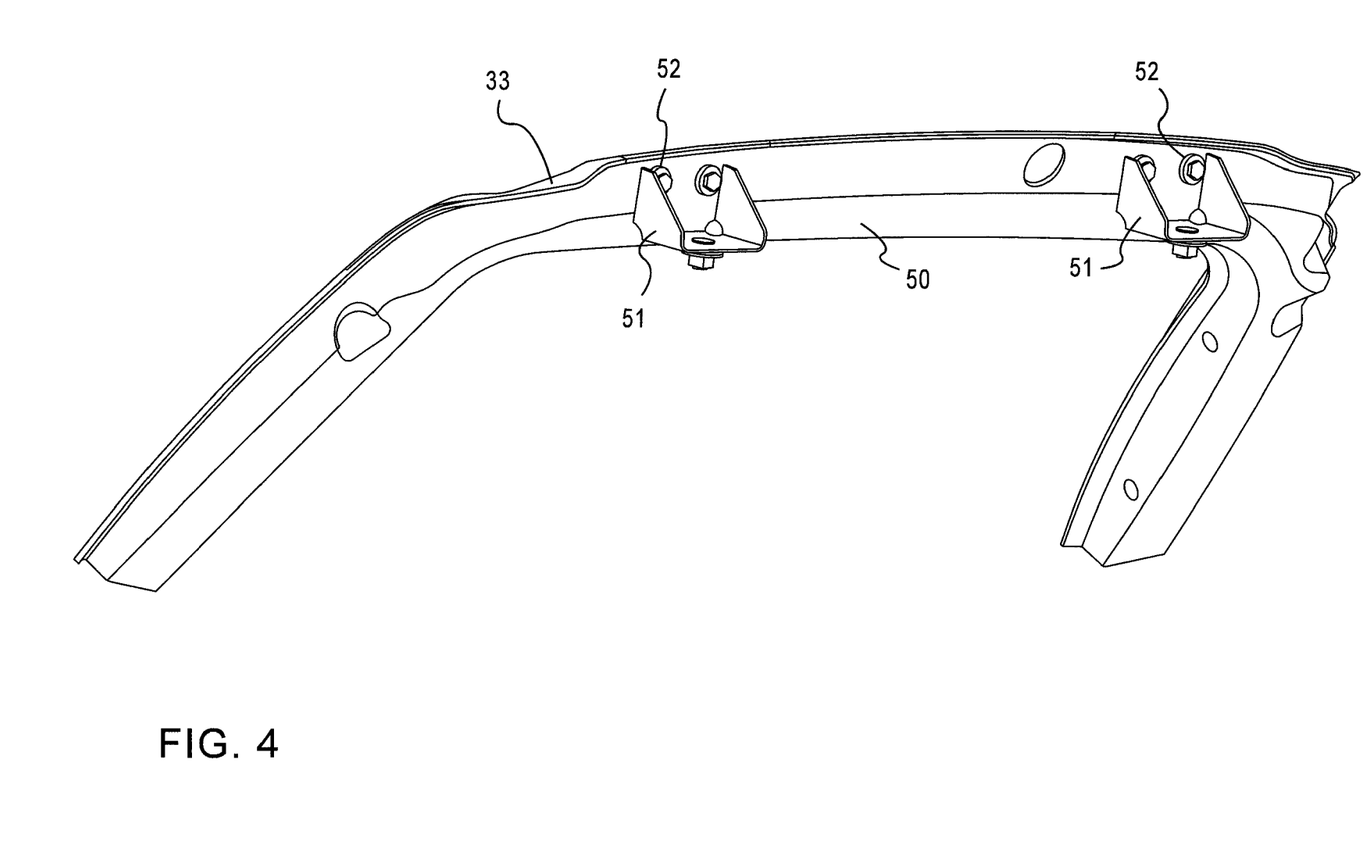
Figure 6:
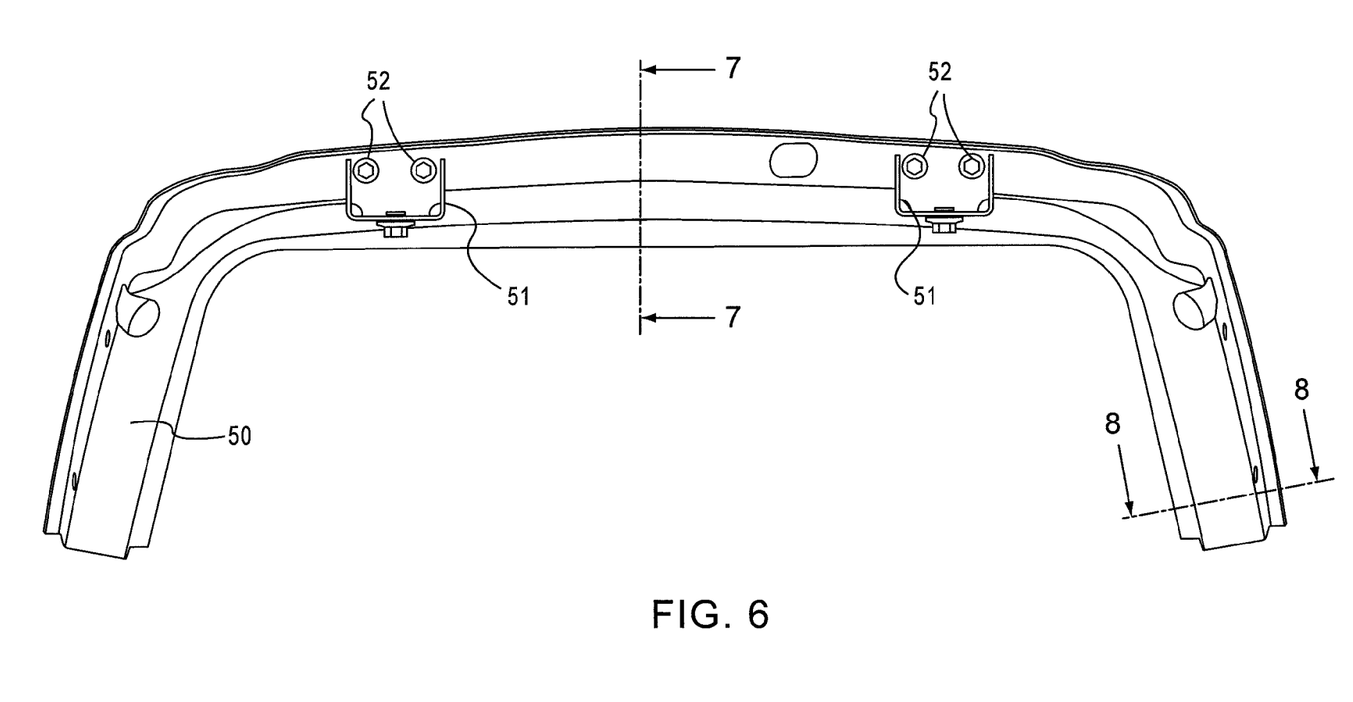

As illustrated in example FIGS. 4 through 6, mounting frame body 31 may be mounted or otherwise secured to BIW 50 of the motor vehicle body via at least one of mechanical fasteners, a suitable adhesive bond and/or snap-fit connection.

As illustrated in example FIG. 4, BIW 50 may be provided with a plurality of holes and brackets 51 having through holes adapted to receive fasteners such as, for example, screw-washer 52 connection. Mounting frame member 30 is sized to be press fit at certain areas on frame of BIW 50. For instance, as illustrated in example FIGS. 4 and 5, cross member 33 may be secured to bracket 51 of BIW 50 via screw/bolt-washer 52 connection. Additionally, vertical members 32 may be secured to BIW 50 via screw/bolt-washer 52 connection.

As illustrated in example FIG. 5, mounting frame member 30 includes mounting frame body 31 adapted to be assembled on and/or over existing weatherstrip 53 secured to the body of the motor vehicle.

Figure 7:
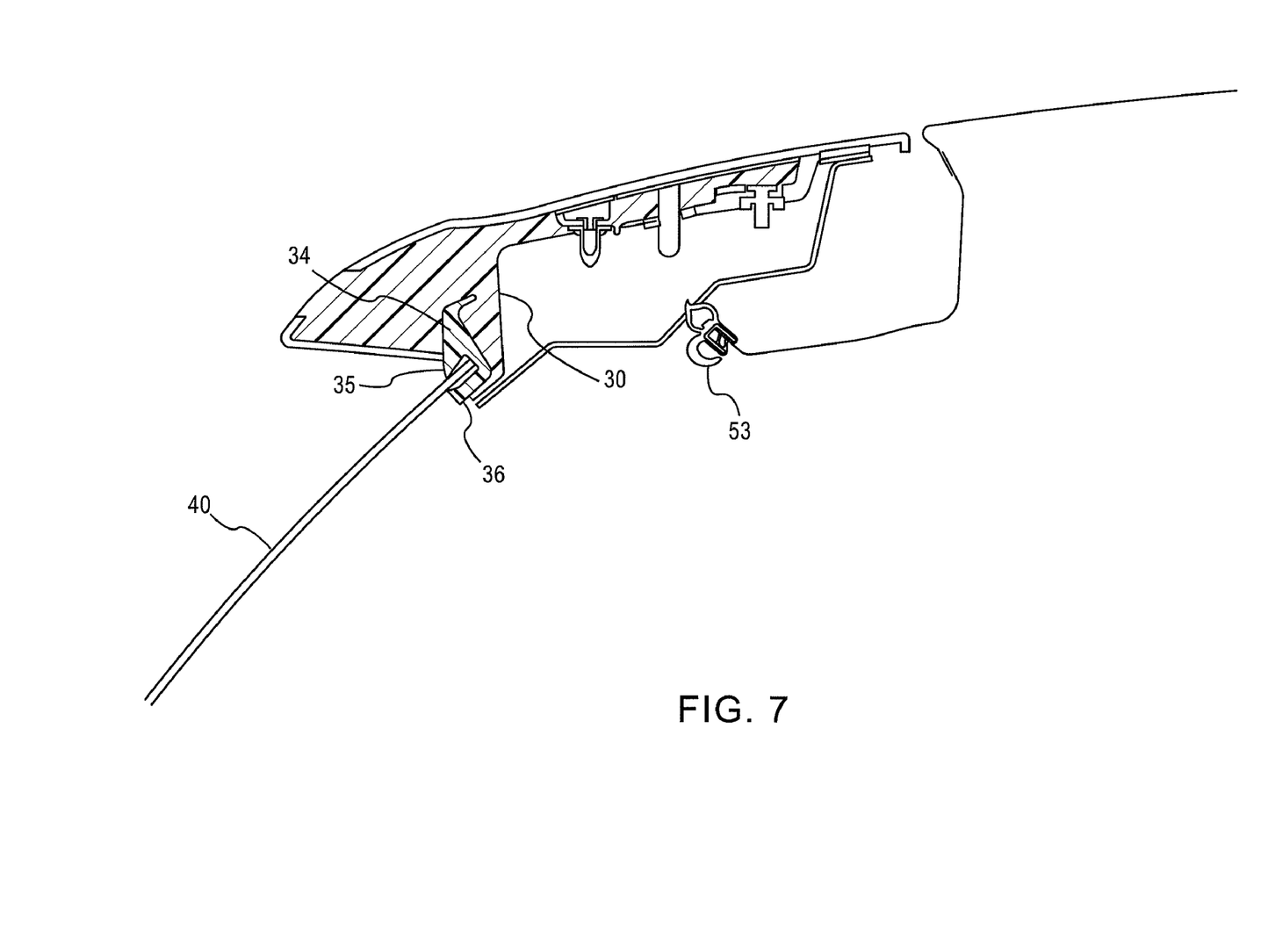
Figure 8:
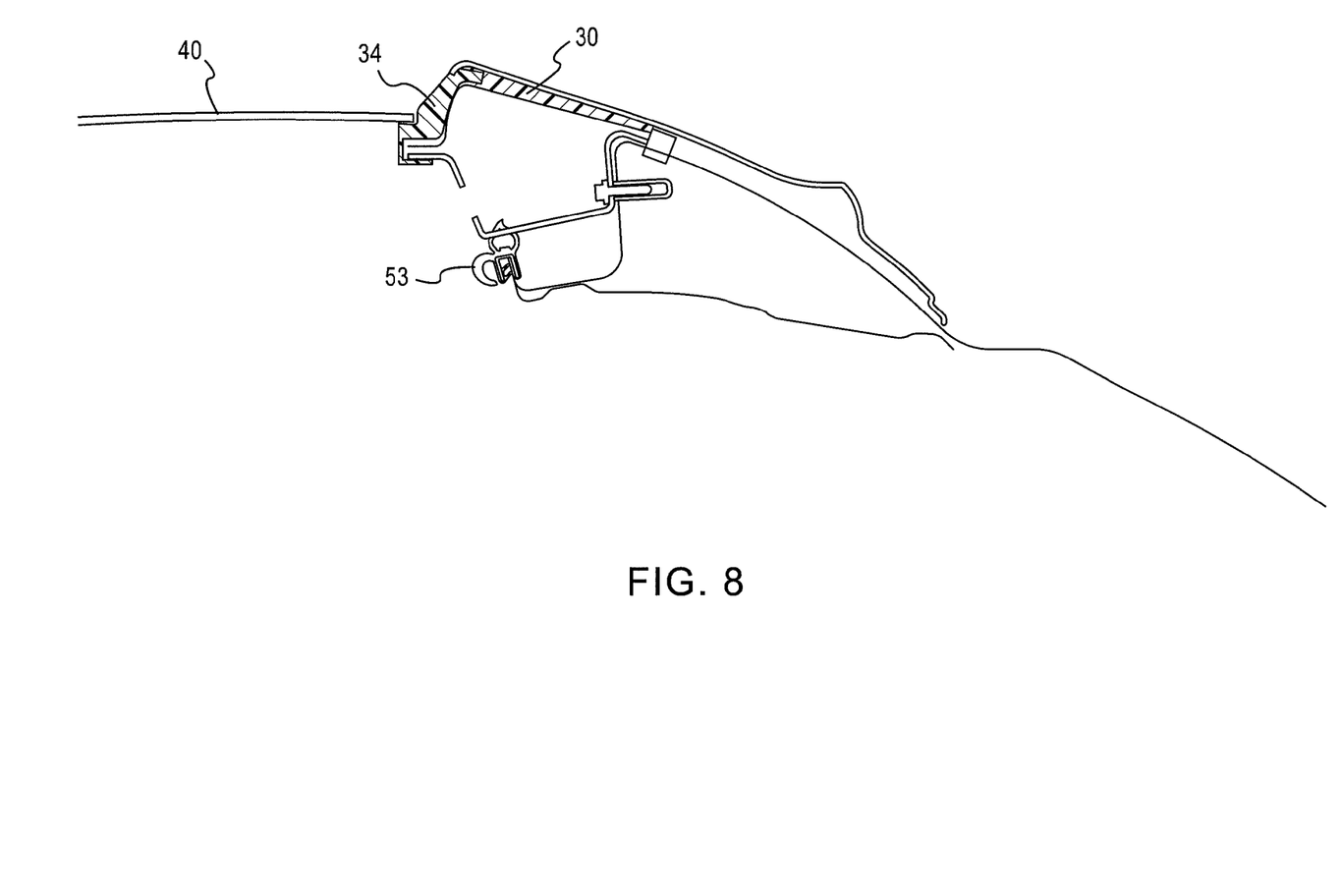

As illustrated in example FIGS. 7 and 8, which are cross-sectional views taken along sections 7-7 and 8-8 in example FIG. 6, respectively, mounting frame member 30 may have a unitary structure that includes sealing weatherstrip 34 which forms a substantially weather tight seal at an interface between mounting frame member 30 and frameless window pane 40 of the after-market tailgate. Sealing weatherstrip 34 may include a pair of parallel, spaced apart upper and lower sealing members 35, 36 which define a channel sized to receive at least an edge of frameless window pane 40.

Figure 9:
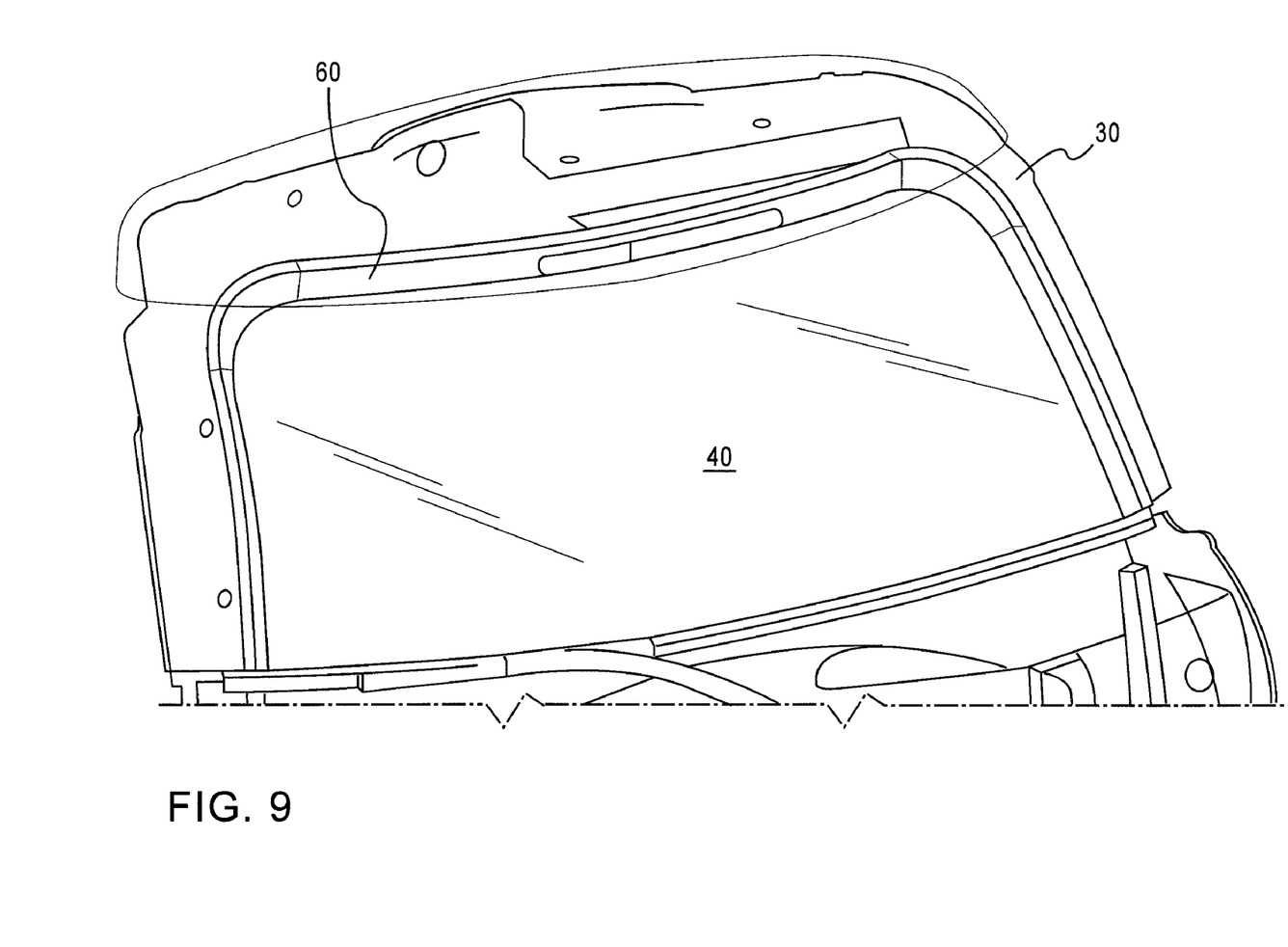

As illustrated in example FIG. 9, a supplemental sealing weatherstrip 60 may be formed separate from mounting frame member 30 to enhance or otherwise supplement the sealing function. In such case, supplemental sealing weatherstrip 60 is provided on and/or over window pane 40 at the inner peripheral surface of mounting frame member 30.

In accordance with embodiments, a mounting frame member is provided for framing and sealing a frameless window pane of an after-market motor vehicle tailgate that replaces a tailgate having a different structure. Because the window pane or tailgate of the after-market replacement tailgate lacks a frame to accept the window pane, this function, in addition to the function of providing a weather tight seal is achieved by way of the mounting frame member and/or a sealing weatherstrip. Such a design serves to reduce manufacturing costs by obviating the need to make structural variants or modifications to the original BIW in order to effectuate after-market changes or replacements to an existing tailgate.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mounting frame member for a tailgate of a motor vehicle having a frameless window pane and a sealing weatherstrip, the mounting frame member comprising: a mounting frame body mounted over the sealing weatherstrip of the motor vehicle, the mounting frame body including an integrally formed second sealing weatherstrip at an inner peripheral region of the mounting frame body to form a seal at an interface between the mounting frame member and the frameless window pane.

2. The mounting frame member of claim 1, wherein the second sealing weatherstrip includes spaced apart upper and lower sealing members defining a channel which receives at least an edge of the frameless window pane.

3. The mounting frame member of claim 2, wherein the mounting frame body is composed of a polymeric material.

4. The mounting frame member of claim 3, wherein the polymeric material comprises a moldable material.

5. The mounting frame member of claim 4, wherein the moldable material comprises a sheet molding compound material.

6. The mounting frame member of claim 1, wherein the mounting frame body is composed of a metal material.

7. The mounting frame member of claim 1, wherein the mounting frame body is composed of one of a polymeric material, a metal material, a composite material and any combination thereof.

8. A mounting frame member for a tailgate of a motor vehicle having a frameless window pane and a sealing weatherstrip, the mounting frame member comprising:
a mounting frame body mounted over the sealing weatherstrip of the motor vehicle, the mounting frame body including an integrally formed second sealing weatherstrip at an inner peripheral region thereof; and
a third sealing weatherstrip provided adjacent the second sealing weatherstrip of the mounting frame body and over the frameless window pane.

9. The mounting frame member of claim 8, wherein the mounting frame body includes a pair of parallel extending vertical members connected by a cross member extending generally perpendicular thereto, the cross member and each vertical member including the sealing weatherstrip.

10. The mounting frame member of claim 8, wherein the mounting frame body is composed of a polymeric material.

11. The mounting frame member of claim 10, wherein the polymeric material comprises a moldable material.

12. The mounting frame member of claim 11, wherein the moldable material comprises a sheet molding compound material.

13. The mounting frame member of claim 8, wherein the mounting frame body is composed of a metal material.

14. The mounting frame member of claim 8, wherein the mounting frame body is composed of one of a polymeric material, a metal material, a composite material and any combination thereof.

15. A motor vehicle tailgate assembly comprising:
a tailgate door mounted to the motor vehicle at an opening thereof by a hinged connection to permit selective movement of the tailgate door about an axis between a closed position an opened position permitting access to an interior of the motor vehicle;
a frameless window pane mounted to the tailgate door;

a mounting frame body mounted to the motor vehicle, the mounting frame body including an integrally formed sealing weatherstrip at an inner peripheral region thereof which forms a first seal at an interface between the mounting frame member and the frameless window pane; and a supplemental sealing weatherstrip provided adjacent the sealing weatherstrip of the mounting frame body and over the frameless window pane to form a second seal at an interface between the sealing weatherstrip and the frameless window pane.

16. The motor vehicle tailgate assembly of claim 15, wherein the mounting frame body is composed of a polymeric material.

17. The motor vehicle tailgate assembly of claim 16, wherein the polymeric material comprises a moldable material.

18. The motor vehicle tailgate assembly of claim 17, wherein the moldable material comprises a sheet molding compound material.

19. The motor vehicle tailgate assembly of claim 15, wherein the mounting frame body is composed of one of a polymeric material, a metal material, a composite material and any combination thereof.

* * * * *